(12) United States Patent
Vos et al.

(10) Patent No.: US 11,399,355 B2
(45) Date of Patent: Jul. 26, 2022

(54) METHOD AND APPARATUS FOR TIME ADVANCE VALIDATION USING REFERENCE SIGNAL RECEIVED POWER

(71) Applicant: Sierra Wireless, Inc., Richmond (CA)

(72) Inventors: Gustav Gerald Vos, Surrey (CA); Amr Adel Nasr Abdelnasser, Vancouver (CA); Lutz Hans-Joachim Lampe, Vancouver (CA)

(73) Assignee: Sierra Wireless, Inc., Richmond (CA)

( * ) Notice: Subject to any disclaimer, the term of this patent is extended or adjusted under 35 U.S.C. 154(b) by 108 days.

(21) Appl. No.: 16/789,938

(22) Filed: Feb. 13, 2020

(65) Prior Publication Data

US 2020/0260397 A1 Aug. 13, 2020

Related U.S. Application Data

(60) Provisional application No. 62/805,174, filed on Feb. 13, 2019.

(51) Int. Cl.
*H04W 56/00* (2009.01)
*H04L 5/00* (2006.01)
(Continued)

(52) U.S. Cl.
CPC ....... *H04W 56/0045* (2013.01); *H04L 5/0048* (2013.01); *H04W 24/10* (2013.01); *H04W 72/0413* (2013.01); *H04W 74/0833* (2013.01)

(58) Field of Classification Search
CPC ......... H04W 56/0045; H04W 74/0833; H04W 72/0413; H04W 24/10; H04W 72/04; H04L 5/0048; H04L 5/003
See application file for complete search history.

(56) References Cited

U.S. PATENT DOCUMENTS

| 10,701,655 B1 * | 6/2020 | Shih ................ H04W 74/0833 |
| 2020/0107396 A1 * | 4/2020 | Wang ................... H04W 80/02 |

(Continued)

FOREIGN PATENT DOCUMENTS

| CN | 110536471 A | 12/2019 | |
| WO | 2020026154 A1 | 2/2020 | |
| WO | WO-2020034571 A1 * | 2/2020 | ........... H04L 5/0094 |

OTHER PUBLICATIONS

International Search Report for PCT/CA2020/050189 dated Apr. 22, 2020 (3 pages).

(Continued)

*Primary Examiner* — Brian T O Connor
(74) *Attorney, Agent, or Firm* — Pierce Atwood LLP; Kevin M. Farrell; Christopher A. Baxter (57) ABSTRACT

There is provided a method and user equipment that enable the evaluation of the validity of a timing advance known to a UE for enabling the UE to transmit using preconfigured uplink resources (PUR). The method includes receiving data enabling determination of a measured change in a reference signal received power by a UE. The UE subsequently determines if the measured change in the RSRP is less than a positive change threshold. If the determination is true, the UE proceeds with the transmission using PUR. In some embodiments, prior to proceeding with the transmission, the UE further evaluates or determines if the measured change in the RSRP is greater than a negative change threshold. The UE will subsequently use PUR for the transmission only if the measured change in the RSRP is greater than a negative change threshold.

9 Claims, 5 Drawing Sheets

(51) Int. Cl.
  *H04W 74/08* (2009.01)
  *H04W 72/04* (2009.01)
  *H04W 24/10* (2009.01)

(56) References Cited

U.S. PATENT DOCUMENTS

2021/0152318 A1* 5/2021 Park .................. H04L 1/0026
2021/0400567 A1* 12/2021 Sha .................... H04L 5/003

OTHER PUBLICATIONS

Written Opinion of the International Searching Authority for PCT/CA2020/050189 dated Apr. 22, 2020 (5 pages).
Sierra Wireless; "R2-1817940 3GPP TSG RAN WG2" Meeting #104; Nov. 2018; Section 6 (9 pages).
Ericsson; "Rel-16 MTC Enhancements for LTE" 3GPP TSG RAN Meeting #80; Jun. 2018 (4 pages).
3GPP TR 36.814; "3rd Generation Partnership Project; Technical Specification Group Radio Access Network; Evolved Universal Terrestrial Radio Access (E-UTRA); Further advancements for E-UTRA physical layer aspects; Release 9" Mar. 2010 (107 pages).
3GPP TS 36.214; "3rd Generation Partnership Project; Technical Specification Group Radio Access Network; Evolved Universal Terrestrial Radio Access (E-UTRA); Physical layer; Measurements; Release 10" Mar. 2011 (13 pages).
3GPP TS 36.211; "3rd Generation Partnership Project; Technical Specification Group Radio Access Network; Evolved Universal Terrestrial Radio Access (E-UTRA); Physical channels and modulation; Release 14" Mar. 2017; Part 1 (7 pages).
3GPP TS 36.211; "3rd Generation Partnership Project; Technical Specification Group Radio Access Network; Evolved Universal Terrestrial Radio Access (E-UTRA); Physical channels and modulation; Release 14" Mar. 2017; Part 2 (68 pages).
3GPP TS 36.211; "3rd Generation Partnership Project; Technical Specification Group Radio Access Network; Evolved Universal Terrestrial Radio Access (E-UTRA); Physical channels and modulation; Release 14" Mar. 2017; Part 3 (79 pages).
3GPP TS 36.211; "3rd Generation Partnership Project; Technical Specification Group Radio Access Network; Evolved Universal Terrestrial Radio Access (E-UTRA); Physical channels and modulation; Release 14" Mar. 2017; Part 4 (40 pages).
3GPP TS 36.133 "3rd Generation Partnership Project; Technical Specification Group Radio Access Network; Evolved Universal Terrestrial Radio Access (E-UTRA); Requirements for support of radio resource management; Release 13" Mar. 2016; Part 1 (47 pages).
3GPP TS 36.133 "3rd Generation Partnership Project; Technical Specification Group Radio Access Network; Evolved Universal Terrestrial Radio Access (E-UTRA); Requirements for support of radio resource management; Release 13" Mar. 2016; Part 2 (316 pages).
3GPP TS 36.133 "3rd Generation Partnership Project; Technical Specification Group Radio Access Network; Evolved Universal Terrestrial Radio Access (E-UTRA); Requirements for support of radio resource management; Release 13" Mar. 2016; Part 3 (257 pages).
3GPP TS 36.133 "3rd Generation Partnership Project; Technical Specification Group Radio Access Network; Evolved Universal Terrestrial Radio Access (E-UTRA); Requirements for support of radio resource management; Release 13" Mar. 2016; Part 4 (636 pages).
3GPP TS 36.133 "3rd Generation Partnership Project; Technical Specification Group Radio Access Network; Evolved Universal Terrestrial Radio Access (E-UTRA); Requirements for support of radio resource management; Release 13" Mar. 2016; Part 5 (325 pages).

* cited by examiner

FIG. 1

(PRIOR ART)

METHOD AND APPARATUS FOR TIME ADVANCE VALIDATION USING REFERENCE SIGNAL RECEIVED POWER

CROSS REFERENCE TO RELATED APPLICATIONS

This application claims the benefit of priority to U.S. Patent Application Ser. No. 62/805,174 entitled "Method and Apparatus for Time Advance Validation Using Reference Signal Received Power" filed Feb. 13, 2019, which is hereby incorporated by reference in its entirety.

FIELD OF THE INVENTION

The present invention pertains to the field of telecommunications and in particular to methods and apparatuses for time advance validation.

BACKGROUND

Figure 1:
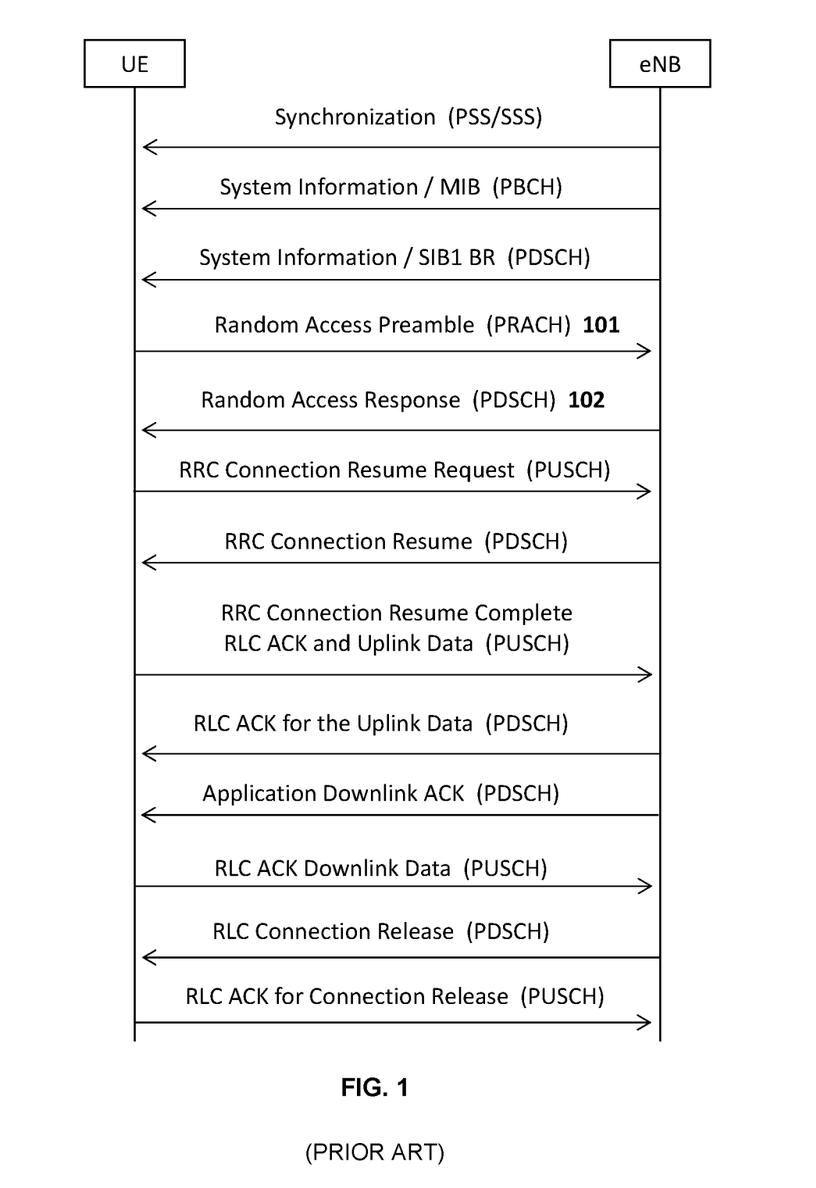
FIG. 1 illustrates an uplink transmission procedure for a UE in radio resource control (RRC) idle mode according to the prior art.

Currently, whenever a user equipment (UE) has data to transmit from idle mode, it must execute the random-access procedure or random access channel (RACH) procedure which requires several messages and lots of signalling overhead. The uplink transmission procedure for a UE in radio resource control (RRC) idle mode is shown in FIG. 1.

Hence, in 3GPP, a new work item has been proposed in RP-181450 in relation to Rel-16 machine type communication (MTC) enhancements for long term evolution (LTE) with an objective of improving uplink (UL) transmission efficiency and/or UE power consumption. The objective is defined as specifying support for transmission in preconfigured resources in idle and/or connected mode based on SC-FDMA waveform for UEs with a valid timing advance.

For 3GPP, it has already been agreed that this objective would be accomplished by supporting the transmission in preconfigured UL resources (PUR) in idle mode so that a UE can skip legacy RACH procedures and start transmission when its PUR is allocated. However, an important aspect related to PUR transmissions is the timing advance (TA). As defined in the objective, the UE can only transmit on PUR if it has a valid timing advance. When a UE moves, the TA will change, thus for mobile UEs, a UE must make sure that it has a valid TA before doing a PUR transmission.

It is known that TA is the amount of time it takes for an eNB transmission to reach the UE plus the amount of time it takes the UE's transmission to reach the eNB. In legacy RACH procedure, the TA is measured by the eNB from the PRACH (msg1 101) and then sent to the UE in the random-access response (RAR) (msg2 102). Also, while the UE is in connected mode, the eNB can continuously adjust the UE's TA via any grant message.

3GPP has made some high-level progress with respect to the TA validation mechanism. For example, an agreement has been reached that in idle mode, at least the following TA validation attributes are supported: 1) Serving cell changes (wherein a serving cell is the cell that the UE is camping on); 2) Time alignment timer for idle mode; 3) Serving cell RSRP changes can be based on the RSRP measurement definition in existing 3GPP Release 15 TS 36.214.

The reference signal received power (RSRP) is defined as the average over the power contributions of the resource elements that carry cell-specific reference signals within the considered measurement frequency bandwidth. For RSRP determination, the cell-specific reference signal R0 is to be used. If the UE can reliably detect that cell-specific reference signal R1 is available, it may use R1 in addition to R0 to determine RSRP.

A change in the RSRP, $\Delta$RSRP, measured by the UE is indicative of a change of a distance $\Delta$d from the eNB. This change $\Delta$d indicates a change in the propagation delay between the UE and the eNB. If this propagation delay exceeds a certain value, the TA currently known to the UE needs to be updated.

As such, a particular problem relates to how to use the RSRP measurements to validate the TA. A first way that RSRP is to compare the "$\Delta$RSRP_Measured" with a pre-defined threshold "$\Delta$RSRP_Threshold", for example as given in Equation 1:

$$\text{Abs}(\Delta\text{RSRP\_Measured}) > \Delta\text{RSRP\_Threshold} \quad (1)$$

If the Equation 1 is true, the UE's current TA is invalid and the UE cannot do a PUR transmission and will fall back to a legacy transmission in order for the UE to receive a new valid TA. However, it has been determined that this method is highly inaccurate as $\Delta$RSRP_Measured will depend on the distance from the eNB.

Accordingly, there may be a need for a method and apparatus for time advance validation that is not subject to one or more limitations of the prior art.

This background information is intended to provide information that may be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

According to an aspect of the present invention, there is provided a method for the evaluation of the validity of a timing advance known to a UE for enabling the UE to transmit using preconfigured uplink resources (PUR). The method includes receiving, by a UE, data enabling determination of a measured change in RSRP and upon determination that the measured change in the RSRP does not exceed a positive change threshold, transmitting, by the UE, using PUR.

In some embodiments, the method further includes, only upon determination that the measured change in the RSRP does not exceed a negative change threshold, transmitting, by the UE, using PUR. In some embodiments, one or both of the positive change threshold and the negative change threshold are defined for a specific UE. In some embodiments, a single threshold is used as the positive change threshold and the negative change threshold. In some embodiments, the positive change threshold and the negative change threshold have the same value.

According to another aspect of the present invention there is provided a UE including a processor and a non-transient memory for storing instructions. The instructions, when executed by the processor cause the UE to be configured to receive data enabling determination of a measured change in RSRP and upon determination that the measured change in the RSRP does not exceed a positive change threshold, transmit using PUR.

In some embodiments, the instructions, when executed by the processor cause the UE to be configured to, only upon determination that the measured change in the RSRP is less than a negative change threshold, transmit using PUR. In some embodiments, one or both of the positive change threshold and the negative change threshold are defined for a specific UE.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Some aspects and embodiments of the present invention may provide a qualification of whether the UE has a valid TA so that it is capable of continuing to use PUR.

BRIEF DESCRIPTION OF THE FIGURES

Further features and advantages of the present invention will become apparent from the following detailed description, taken in combination with the appended drawings, in which.

DETAILED DESCRIPTION

As previously noted, if the Equation 1 is true, the UE's current TA is invalid and the UE cannot do a PUR transmission and will fall back to a legacy transmission in order for the UE to receive a new valid TA. However, it has been determined that this method is highly inaccurate as the magnitude of ΔRSRP_Measured will vary depending on the distance from the eNB. The TA value will vary proportionally to distance from the eNB. As such, a single threshold for positive and negative changes of RSRP will correspond to different TA change amounts when the UE is moving closer to the eNB and further away from the eNB. A single threshold appropriate for one direction appropriate for one direction of TA change is therefore highly inaccurate for the other direction of TA change.

There is provided a method and user equipment that enable the evaluation of the validity of a timing advance known to a UE for enabling the UE to transmit using preconfigured uplink resources (PUR). The method includes receiving data enabling determination of a measured change in a reference signal received power by a UE. The UE subsequently determines if the measured change in the RSRP exceeds a positive change threshold. If the determination is that the positive threshold has not been exceeded, the UE proceeds with the transmission using PUR.

For example, the UE receives a signal containing data from the eNB, wherein measurements can be made on the signal in order to obtain an indication of the current RSRP.

The UE can subsequently compare this measured RSRP with the previously measured RSRP in order to determine a measured change in the RSRP.

In some embodiments, prior to proceeding with the transmission, the UE further evaluates or determines if the measured change in the RSRP exceeds a negative change threshold. The UE will subsequently use PUR for the transmission only if the measured change in the RSRP does not exceed the negative change threshold.

Figure 2:
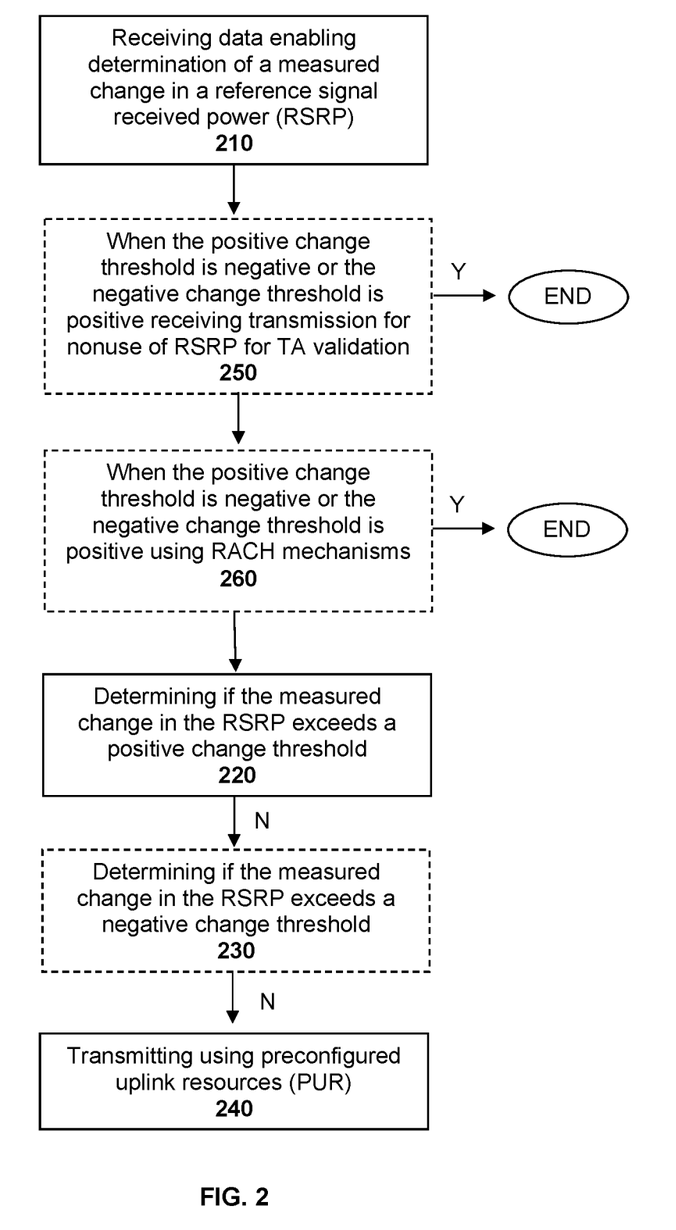
FIG. 2 illustrates a method for evaluation of the validity of a timing advance for enabling use of preconfigured uplink resources (PUR), in accordance with embodiments.

FIG. 2 illustrates a method for the evaluation of the validity of a timing advance known to a UE for enabling the UE to transmit using preconfigured uplink resources (PUR). The method includes the UE receiving data enabling determination of a measured change in a reference signal received power (RSRP) 210. The UE will subsequently evaluate the measured change and determine if the measured change in the RSRP is less than a positive change threshold 220. Upon a determination that the RSRP is less than the positive change threshold the UE considers the timing advance to be valid and subsequently transmits using preconfigured uplink resources (PUR) 240.

In some embodiments, the UE further determines if the measured change in the RSRP is greater than a negative change threshold 230. Upon a determination that the RSRP is greater than the negative change threshold the UE considers this as further validation that the timing advance and can thus transmitting using PUR is appropriate.

In some embodiments, when the positive change threshold is determined to be negative or the negative change threshold is determined to be positive, the method further includes receiving by the UE from the evolved Node B (eNB) a transmission indicating nonuse of RSRP for TA validation 250.

In some embodiments, when the positive change threshold is determined to be negative or the negative change threshold is determined to be positive, the method further includes using by the UE, RACH mechanisms 260 for configuring uplink resources for transmissions.

For example, if the positive change threshold or the negative change threshold are exceeded the UE is configured for non-transmission using PUR. If either of the thresholds are exceeded, the UE is configured to use RACH mechanisms in order to configure uplink resources for transmissions.

For further clarity, according to embodiments, a UE is given a TA value matching its known location, by the eNB when the PUR is configured. The UE will save a current self-measured RSRP as a starting reference RSRP associated with the TA value provided by the eNB. A current and possibly different TA value is also a component of response messages received by the UE after each UE PUR transmission. In some embodiments, the UE is either provided a single RSRP change threshold value or the UE may alternatively be provided an upper threshold and a different lower threshold. The RSRP change thresholds correspond to the individual TA value provided at PUR configuration and each update thereto. In order to derive the RSRP thresholds that match a TA, the eNB can determine appropriate D RSRP value(s) for the particular UE or less accurate generic values for all UEs for the particular TA. At a time X just prior to a UE being scheduled to transmit PUR, the UE will determine the current RSRP. It is noted that this determined current RSRP is not provided by the eNB. At time X, the UE performs the comparison test(s) to see if the RSRP change since when the UE was configured for PUR or last updated for PUR, exceeds what has been set as a threshold. If the RSRP has changed too much the UE does not transmit. The UE performs a RACH procedure to obtain a new TA and also new RSRP threshold(s). Alternatively, if the RSRP has not changed such that the one or more of the thresholds are exceeded, the UE transmits on the PUR previously assigned thereto.

According to some embodiments, rather than the eNB determining the RSRP change thresholds at each TA configuration for updating the UE, the eNB can determine the RSRP change thresholds in advance and build a table associating or correlating the RSRP change thresholds with the TAs. Having done this the eNB could reference the table in order to obtain the RSRP change thresholds to accompany the TA when communicating with the UE. The eNB could alternatively send the whole table to the UE at the time of initial configuration and the UE can save this table for future reference. This embodiment can allow the eNB to only send the TA updates in the PUR responses and the UE would subsequently look up the RSRP change thresholds that match the given TA.

In some embodiments, the UE can calculate the RSRP change thresholds either on an as needed basis or in advance and subsequently save this information in a table, or similar configuration, associating or correlating TAs with the RSRP change thresholds. In this embodiment, the eNB would only need to send the TA value and the UE would be capable of deriving the matching RSRP change thresholds either on an as needed basis or by reference to the saved table determined in advance. In such an embodiment, the eNB would need to provide the UE with information in order for it to complete the above defined calculations.

According to another embodiment, the UE is given, for example by the eNB, one or more RSRP change thresholds, for example in a table format, paired with TA values at the time of PUR configuration. According to other embodiments, the UE can be configured to determine RSRP thresholds that match the respective TAs.

As noted above, it is understood that if Equation 1 is true, the UE's current TA is invalid and the UE cannot do a PUR transmission and will fall back to a legacy transmission in order for the UE to receive a new valid TA. Furthermore, also as noted above it has been determined that this method is highly inaccurate as $\Delta$RSRP_Measured will depend on the distance from the eNB. Accordingly, it has been determined that a single threshold for the determination of TA validity can be used, however it may not be the most accurate.

It has been determined that measured RSRP in dB can be generalized as:

$$RSRP(d_i) = P_{tx} - PL(d_i) \qquad (2)$$

where: $P_{tx}$ is the eNB transmit power; $d_i$ is the distance from eNB; and PL is the path loss.

Path loss equations in dB usually take the form:

$$PL(d_i)_{dB} = k \log_{10}(d_i) + X \qquad (3)$$

where: k and X depend on many practical elements such as antenna height and environment (e.g. urban, suburban, rural); and $d_i$ is the distance between the UE and the eNB.

Some examples of path loss equations are defined below:
NLOS urban, suburban, and rural macro path loss equation can be defined as:

$$PL(d_i) = 161.04 - 7.1 \log_{10}(W) + 7.5 \log_{10}(h) - (24.37 - 3.7(h/h_{BS})^2)\log_{10}(h_{BS}) + (43.42 - 3.1 \log_{10}(h_{BS}))(\log_{10}(d_i) - 3) + 20 \log_{10}(f_c) - (3.2(\log_{10}(11.75h_{UT}))^2 - 4.97)$$

This path loss equation, when re-written in the form of "[[k]] $\log_{10}(d_i)$+{{X}}" form is represented as, wherein k is surrounded by double square brackets and X is surrounded by double curly brackets:

$$PL(d_i) = [[(43.42 - 3.1 \log_{10}(h_{BS}))]](\log_{10}(d_i) + \{\{161.04 - 7.1 \log_{10}(W) + 7.5 \log_{10}(h) - (24.37 - 3.7(h/h_{BS})^2)\log_{10}(h_{BS}) - 3*(43.42 - 3.1 \log_{10}(h_{BS})) + 20 \log_{10}(f_c) - (3.2(\log_{10}(11.75h_{UT}))^2 - 4.97)\}\}$$

where, W is the street width; h is the average building height; $h_{BS}$ is the eNB antenna height; $h_{UT}$ is the UE antenna height; and $f_c$ is the center frequency in Hz.

Given the above, the path loss for an urban micro non-line of sight (NLOS) hexagonal cell layout can be defined as: $PL(d_i) = [[(36.7)]] (\log_{10}(d_i) + \{\{26 \log_{10}(f_c) + 22.7\}\}$.

The path loss for an indoor hot spot NLOS path loss can be defined as: $PL(d_i) = [[(43.3)]] (\log_{10}(d_i) + \{\{20 \log_{10}(f_c) + 11.5\}\}$.

The path loss for a free space can be defined as: $PL(d_i) = [[(20)]] (\log_{10}(d_i) + \{\{20 \log_{10}(f_c) - 147.55\}\}$.

Having regard to the above examples, it is noted that the term {{X}} in all the above equations does not depend on $d_i$. Accordingly, the RSRP equation can be generalized as given in Equation 4.

$$RSRP(d_i) = P_{tx} - k \log_{10}(d_i) - X \qquad (4)$$

If it is considered that a UE moves a distance $\Delta d$, the UE will experience a change in the RSRP that can be expressed as defined in Equation (5).

$$\Delta RSRP(d_i) = (P_{tx} - k_2 \log_{10}(d_i) - X_2) - (P_{tx} - k_1 \log_{10}(d_i \pm \Delta d) - X_1) \qquad (5)$$

Furthermore, assuming the path loss equation remains constant from $d_i$ to $d_i \pm \Delta d$ then $k_1 = k_2$ and $X_1 = X_2$, and Equation 5 can be simplified to Equation 6.

$$\Delta RSRP(d_i) = k(\log_{10}(d_i \pm \Delta d) - \log_{10}(d_i)) \qquad (6)$$

Where: $+\Delta d$ is for a UE moving away from the eNB; and $-\Delta d$ is for a UE moving towards the eNB.

As can be determined from the above equations, $\Delta$RSRP depends on both $\Delta d$ and $d_i$. Accordingly, it has been determined that a constant $\Delta$RSRP threshold, for example, will not work well across a broad cell radius.

Figure 3:
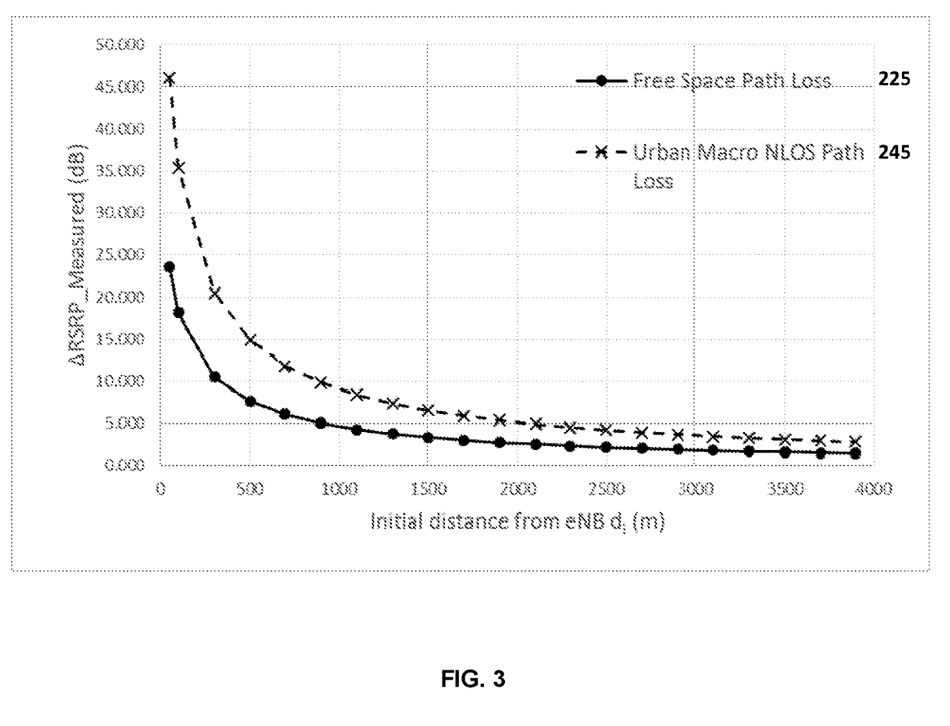
FIG. 3 illustrates ΔRSRP as a function of the initial distance $d_i$ from the eNB according to embodiments.

FIG. 3 illustrates $\Delta$RSRP as a function of the initial distance $d_i$ from the eNB according to embodiments. FIG. 3 shows this dependency where the measured $\Delta$RSRP is plotted against the initial distance from the eNB ($d_i$) for the free space path loss 225 and the urban macro NLOS path loss models 245 for a UE that is moving away from the eNB. These models were chosen as they represent the two extremes of wireless environments.

Figure 4:
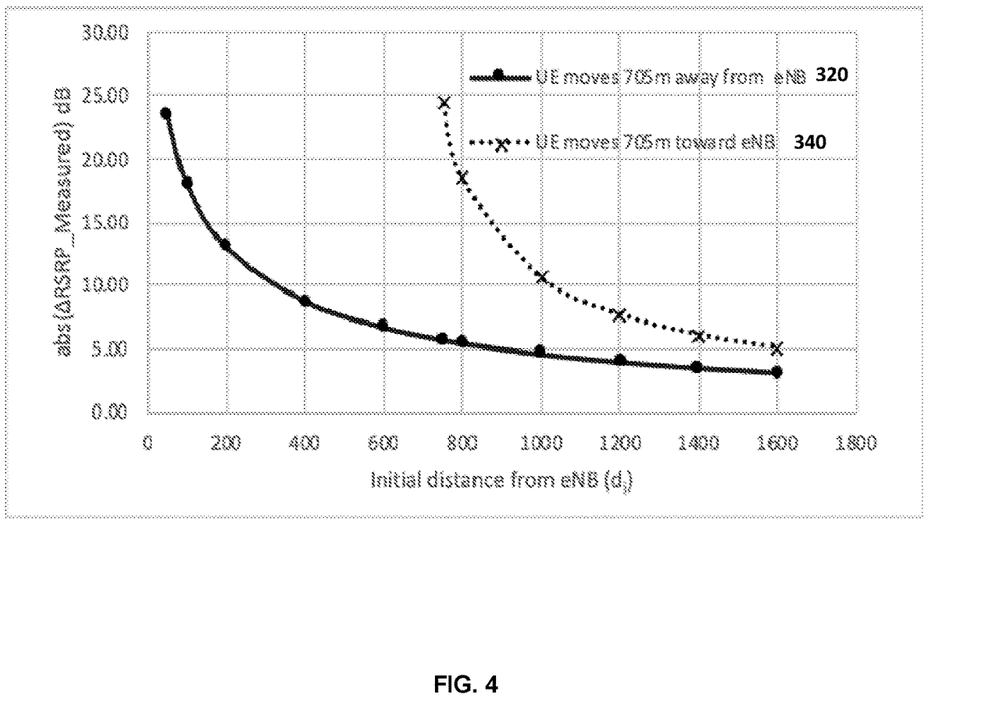
FIG. 4 illustrates abs(ΔRSRP_measured) as a function of the initial distance $d_i$ for a UE moving 705*m* towards and away from eNB, according to embodiments.

FIG. 4 represents data that has been determined assuming a constant distance $\Delta d = 705$ meters with the UE moving away from the eNB, which substantially corresponds to a one cyclic prefix timing error in the TA. It has been determined that a further issue with using a single threshold as noted in Equation 1, is that the abs($\Delta$RSRP_Measured) is very different if the UE moves towards the eNB vs the UE moving away from the eNB. The abs($\Delta$RSRP_measured) as a function of the initial distance $d_i$ for a UE moving 705m towards and away from eNB is illustrated in FIG. 4. It can be seen that there is a very clear difference in the abs ($\Delta$RSRP_Measured) for free space path loss between a UE moving towards the eNB 340 and UE moving away from the eNB 320.

According to embodiments, it is assumed that the change in RSRP is defined:

$$\Delta RSRP\_Measured = RSRP\_reference - RSRP\_current \qquad (7)$$

Where: RSRP_reference is the RSRP measured when the TA was given to the UE; and RSRP_current is the RSRP measured when the TA is being evaluated.

Having regard to Equation 7, if RSRP_reference is −60 dBm and RSRP_current is −50 dBm, ΔRSRP_Measured is −10 dB. In addition, if RSRP_reference is −60 dBm and RSRP_current is −70 dBm, ΔRSRP_Measured is +10 dB.

Furthermore, if the UE moves closer to the eNB, then the ΔRSRP_Measured will be negative and ΔRSRP_Measured will be positive if the UE moves away from the eNB. At the same initial distance from the eNB, the absolute value of the ΔRSRP_Measured will be larger when moving closer to the eNB than the absolute value of the ΔRSRP_Measured when moving away from the eNB. This can be seen with reference to FIG. 4.

According to embodiments, two thresholds will be needed in order to evaluate if TA is valid. According to embodiments, a first threshold is ΔRSRP_ThNeg which applied to the case where the UE moves towards the eNB. According to embodiments, a second threshold is ΔRSRP_ThPos which is applied to the case when the UE moves away from the eNB.

According to embodiments, the UE will evaluate the TA validity using the following condition:

$$\Delta RSRP\_ThNeg < \Delta RSRP\_Measured < \Delta RSRP\_ThPos \qquad (8)$$

According to embodiments, if the condition as defined by Equation 8 is not met, then the TA currently known to the UE is invalid.

As an example, let $d_i$ be the distance from the eNB when the TA was given to the UE. The MaxAllowedΔd is considered as the maximum allowed UE movement towards or away from the eNB for which the TA is still valid.

In the example when the $d_i$ is less than the MaxAllowedΔd (for example, when UE is closer to the eNB than the MaxAllowedΔd, which will be readily understood to be a distance change threshold), any movement towards the eNB will not invalidate the TA. So, the UE only needs to evaluate a positive ΔRSRP_Measured as follows:

$$\Delta RSRP\_Measured < \Delta RSRP\_ThPos \qquad (9)$$

It is considered that if the condition as defined in Equation 9 is not met, then the TA is invalid.

According to some embodiments, the UE is configured to determine the above noted thresholds, namely ΔRSRP_ThPos and ΔRSRP_ThNeg. When the UE receives a TA value from the eNB, the UE is configured to determine ΔRSRP_ThPos using Equation 10.

$$\Delta RSRP\_ThPos = k(\log_{10}(d_i + \text{MaxAllowed}\Delta d) - \log_{10}(d_i)) - Z_{margin} \qquad (10)$$

In addition, if (di−MaxAllowedΔd)>0) then ΔRSRP_ThNeg is determined using Equation 11 and Equation 8 is used to determine if the TA is valid.

$$\Delta RSRP\_ThNeg = k(\log_{10}(d_i - \text{MaxAllowed}\Delta d) - \log_{10}(d_i)) + Z_{margin} \qquad (11)$$

However, if ($d_i$−MaxAllowedΔd)>0) is not met, then Equation 9 is used to determine if the TA is valid.

According to embodiments, ΔRSRP_ThNeg should be a negative value and ΔRSRP_ThPos should be a positive value. The above calculation of ΔRSRP_ThNeg and ΔRSRP_ThPos only needs to occur when the TA is updated by the eNB which will be infrequent and accordingly there are likely minimal concerns of microprocessor capability (MIPS) without the need for interlocked pipelined stages or additional UE power consumption for performing these calculations. It is understood that the UE will have to perform the "log" function but this is considered to be within the UE capabilities since RSRP is reported in dB.

According to embodiments, the term $Z_{margin}$ creates a margin for measurement errors which minimize the UE errors regarding updating the TA when it is was not needed vs. using an invalid TA. It is understood that using an invalid TA is a worse scenario when compared with updating the TA when it is was not needed. It is understood that the RSRP intra frequency relative accuracy for UE category M1 with coverage enhancement (CE) mode A for half duplex frequency division duplex (HD-FDD) can be as high as 4 dB. Also, it is considered that the TA measurement of the eNB will not be perfect so $d_i$ will have error. A dramatic change of the environment from position $d_i$ to $d_i + \Delta d$ is also a source for error. The amount of margin (e.g. $Z_{margin}$) to add is up to the eNB so the eNB could broadcast a $Z_{margin}$ via system information since the eNB would be cell/sector specific or could inform the UE via direct signalling.

According to embodiments, the UE can calculate $d_i$ based on the last valid TA based on Equation 12:

$$d_i = TA \times c/2 \qquad (12)$$

Where: c is the speed of light

According to embodiments, as previously disclosed, k is a constant that is propagation conditions specific, for example k depends on one or a combination of topology and configuration of the cell. For example, in some embodiments k=20 for free space; k=36.7 for hexagonal cell layout urban micro NLOS; k=43.1 for indoor NLOS. As would be readily understood other values for varying configuration, topologies of the cell may be used and the above are merely to be considered as examples.

According to embodiments, the propagation conditions which the eNB's cell/sector covers would be known a priori so the eNB could broadcast k via system information since it would be cell/sector specific or could inform the UE via direct signalling.

According to embodiments, Δd relates to the amount of timing error the eNB can tolerate. As an example, a maximum allowed timing error can be determined according to Equation 13:

$$\text{Maximum allowed Timing Error} = 2 * \text{MaxAllowed}\Delta d/c \qquad (13)$$

For example, a MaxAllowedΔd=705 meters corresponds to 4.7 us which is the normal cyclic prefix (CP). The amount of timing error the eNB can tolerate depends on the eNB implementation which can be considered to be constant and also known a priori in order that the eNB can broadcast Δd to the UE, for example using system information as Δd would be cell specific or the eNB can inform the UE via direct signalling.

According to some embodiments, when $d_i$ gets large and $Z_{margin}$ is non-zero, it is possible that ΔRSRP_ThPos becomes negative or ΔRSRP_ThNeg to be positive which means the UE can't reliably determine if the TA is valid based on RSRP. In an instance wherein after the eNB measures the TA, the eNB can calculate the thresholds and if either ΔRSRP_ThPos is negative or ΔRSRP_ThNeg is positive for the position $d_i$, the eNB can inform UE to not use RSRP to validate TA or the eNB can disable PUR transmissions for that UE and inform the UE to use legacy RACH mechanisms. If the UE gets closer to the eNB, the eNB then re-enable PUR transmissions.

According to embodiments, for both informing the UE to not use RSRP to validate TA or disabling PUR transmissions for that UE and inform the UE to use legacy RACH mechanisms, these actions can be taken by the eNB without explicit signalling to the UE because the UE will also autonomously determine that the ΔRSRP_ThPos is negative or ΔRSRP_ThNEg is positive and thus the UE, based on pre-configuration, can assume one of these actions will be taken by the eNB.

According to embodiments, the eNB can adjust the values of k and Δd based on the success or failure of the TA validation. For example, if the eNB observes that UEs are using invalid TA more frequently than desired, for example greater than 1% of the time, across the entire cell, the eNB can perform one or more actions including decreasing Δd and increasing $Z_{margin}$. For example, if the eNB observes UEs that are far away from the eNB are using an invalid TA more frequently than UEs close to the cell, k can be increased. According to embodiments, this configuration of the eNB may be left to be determined based on the specific implementation of the eNB, and thus specifically requiring this configuration for the eNB may not be required.

According to some embodiments, the eNB or the UE is configured to create generalized threshold functions, for example one for the positive threshold and one for the negative threshold.

According to some embodiments, the generalized threshold functions can be learned. For example, the generalized threshold functions can be evaluated based on a plurality of data indicative of previous TA updates and RSRP updates. The generalized threshold functions can be evaluated for example by the following process. Initially a function which estimates the expected RSRP value at different distances 'd' is created. This can be estimated or evaluated from the historical TA updates and RSRP updates in the cell for all of the UEs serviced by that cell. Each time the eNB updates the TA of a UE, the eNB can request the RSRP measurement from that UE. The eNB can then use those measurements, for example a collection of data points which can be collected from the plurality of UEs (i.e. crowd sourced data) to create a function which best estimates the expected RSRP value for all TA values or distances where 'd'=TA*c/2. The expected RSRP value can be determined according to Equation 14:

$$\sim RSRP = RSRPEst(d = TA * c/2) \quad (14)$$

According to embodiments, using this estimated RSRP, the eNB can then evaluate the functions that can be used to generate ΔRSRP_ThNeg and ΔRSRP_ThPos for a particular Δd. For example, ΔRSRP_ThPos can be determined according to Equation 15 and ΔRSRP_ThNeg can be determined according to Equation 16.

$$\Delta RSRP\_ThPos = RSRPEst(d_i) - RSRPEst(d_i - \Delta d) \quad (15)$$

$$\Delta RSRP\_ThNeg = RSRPEst(d_i) - RSRPEst(d_i - \Delta d) \quad (16)$$

According to some embodiments, the UE could also generate the RSRPEst (d) function, however the UE would have few RSRP vs 'd' data points that could be used for the estimation of an appropriate function for RSRPEst (d).

The functions presented above are examples of functions that can provide a means for the determination of the thresholds for evaluation of TA validity. It will be readily understood that a variety of other functions or equations can be used for the determination of ΔRSRP_ThNeg and ΔRSRP_ThPos, and these can include the expressions presented in Equation 10 and Equation 11 above.

Given the above discussion relating to the evaluation of the positive threshold and negative threshold for the evaluation of the validity of the TA currently known to a UE, the eNB or the UE can be configured for the evaluation of these thresholds. In some embodiments, the UE will determine the thresholds and thus would have access thereof in order for the determination of the validity of the TA. In some embodiments, when the eNB estimates the TA, the eNB can calculate the ΔRSRP_ThNeg and ΔRSRP_ThPos thresholds and send these thresholds directly to the UE. These thresholds could be sent via UE specific signalling for example.

For example, in some embodiments, the eNB can be configured to calculate the RSRP change thresholds for a range of TA values and send these determined thresholds to the UE during PUR configuration to save as a table so that by sending only TA updates, for example in PUR responses and configuration updates, the UE can look up the matching RSRP change thresholds for evaluation of the validity of a TA value currently known to the UE.

In other embodiments, the RSRPEst function, namely a more generalized function for the determination of the threshold, can be estimated by the eNB and subsequently broadcasted for all UEs to use thereby. According to embodiments, the generalized function can be configured as a polynomial or a piecewise continuous equation or other suitable equation configuration as would be readily understood. The broadcasting of the generalized function can require less overall signaling for provision thereof to the UEs, however this generalized function may be less flexible and possibly less accurate than UE specific thresholds.

Figure 5:
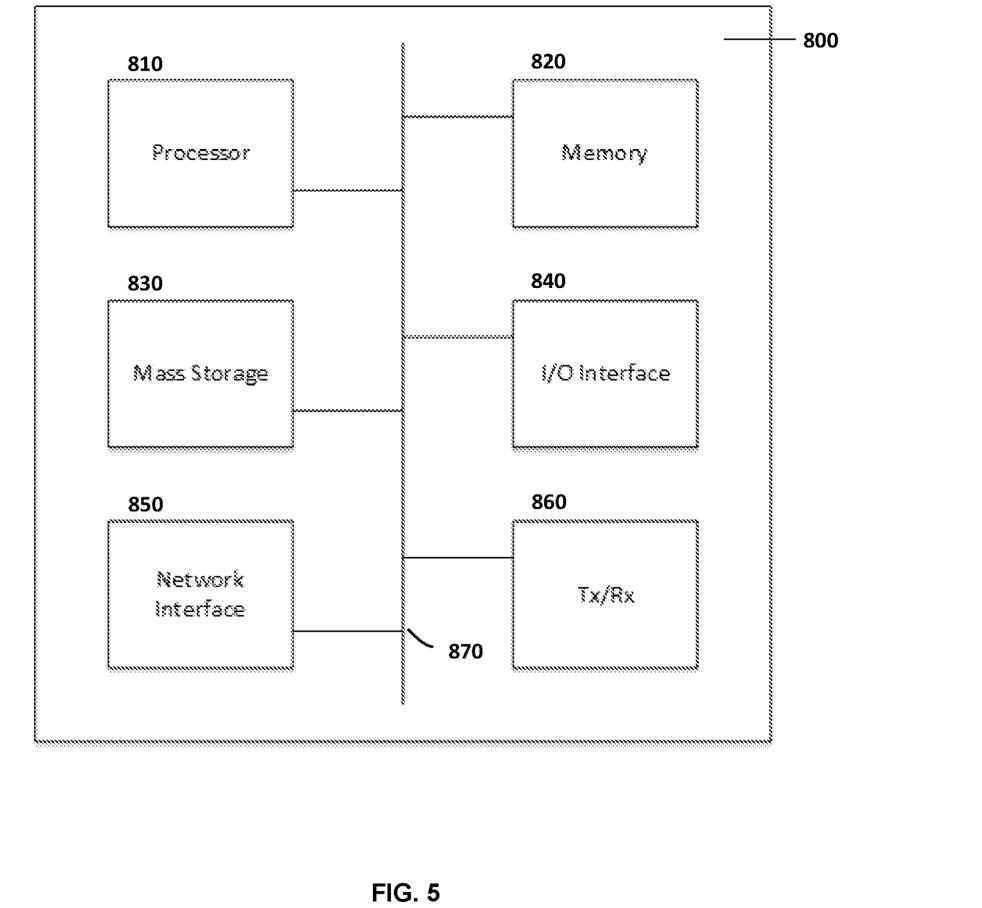
FIG. 5 is a schematic diagram of an electronic device according to embodiments.

FIG. 5 is a schematic diagram of an electronic device 800 that may perform any or all of the steps of the above methods and features described herein, according to different embodiments of the present invention. For example, a UE may be configured as the electronic device. Further, a base station, eNB, gNB or NB may be configured as the electronic device 800.

As shown, the device includes a processor 810, memory 820, non-transitory mass storage 830, I/O interface 840, network interface 850, and a transceiver 860, all of which are communicatively coupled via bi-directional bus 870. According to certain embodiments, any or all of the depicted elements may be utilized, or only a subset of the elements. Further, the device 800 may contain multiple instances of certain elements, such as multiple processors, memories, or transceivers. Also, elements of the hardware device may be directly coupled to other elements without the bi-directional bus.

The memory 820 may include any type of non-transitory memory such as static random access memory (SRAM), dynamic random access memory (DRAM), synchronous DRAM (SDRAM), read-only memory (ROM), any combination of such, or the like. The mass storage element 830 may include any type of non-transitory storage device, such as a solid state drive, hard disk drive, a magnetic disk drive, an optical disk drive, USB drive, or any computer program product configured to store data and machine executable program code. According to certain embodiments, the memory 820 or mass storage 830 may have recorded thereon statements and instructions executable by the processor 810 for performing any of the aforementioned method steps described above.

As will be readily understood by the description above, the terms base station and network node can be interchangeably used to define an evolved NodeB (eNB), a next generation NodeB (gNB) or other base station or network node configuration.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for evaluation of validity of a timing advance for enabling use of preconfigured uplink resources (PUR), the method comprising:
   receiving, by a user equipment (UE), a signal enabling determination of a measured change in a reference signal received power (RSRP); and
   upon determination that the measured change in the RSRP is less than a positive change threshold and is greater than a negative change threshold, transmitting, by the UE, using PUR.

2. The method of claim 1, wherein the positive change threshold is defined for a specific UE.

3. The method of claim 1, wherein the negative change threshold is defined for a specific UE.

4. The method of claim 1, further comprising receiving, by the UE, a table indicative of a correlation between TA and RSRP change thresholds and storing, by the UE, the table.

5. The method of claim 1, wherein a single threshold value is received by the UE, which is the absolute value of the positive change threshold and the absolute value of the negative change threshold.

6. A user equipment (UE) comprising:
   a processor; and
   a non-transient memory for storing instructions that when executed by the processor cause the UE to be configured to:
   receive a signal enabling determination of a measured change in a reference signal received power (RSRP); and
   upon determination that the measured change in the RSRP is less than a positive change threshold and is greater than a negative change threshold, transmit using preconfigured uplink resources (PUR).

7. The UE of claim 6, wherein the positive change threshold is defined for a specific UE.

8. The UE of claim 6, wherein the negative change threshold is defined for a specific UE.

9. The UE of claim 6, wherein the instructions when executed by the processor cause the UE to be configured to receive a table indicative of a correlation between TA and RSRP change thresholds and store the table.

* * * * *

UNITED STATES PATENT AND TRADEMARK OFFICE
CERTIFICATE OF CORRECTION

PATENT NO. : 11,399,355 B2
APPLICATION NO. : 16/789938
DATED : July 26, 2022
INVENTOR(S) : Gustav Gerald Vos, Amr Adel Nasr Abdelnasser and Lutz Hans-Joachim Lampe It is certified that error appears in the above-identified patent and that said Letters Patent is hereby corrected as shown below:

In the Specification

Column 4, Line 58 - "determine approximate D RSRP value(s)" should read "determine approximate $\Delta$ RSRP value(s)"

Signed and Sealed this
Twenty-first Day of March, 2023

Katherine Kelly Vidal
*Director of the United States Patent and Trademark Office*